Oct. 21, 1958 — E. UECKERT — 2,857,576
COUPLING DEVICES
Filed Aug. 14, 1956
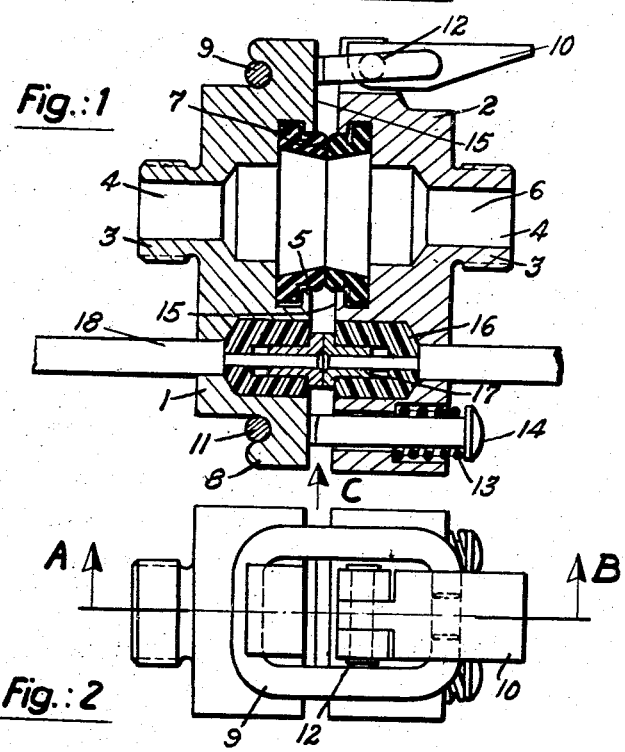

United States Patent Office 2,857,576
Patented Oct. 21, 1958

2,857,576
COUPLING DEVICES

Ernst Ueckert, Mannheim, Germany, assignor to Knorr-Bremse G. m. b. H., Munich, Germany Application August 14, 1956, Serial No. 603,988

Claims priority, application Germany June 2, 1956

2 Claims. (Cl. 339—16)

This invention relates to coupling devices for fluid conduits and electrical cables, and is more particularly, but not exclusively, concerned with the releasable connection of a compressed air supply pipe and an ignition cable of a tool operated by an internal combustion engine, for whose operation compressed air is required for the return stroke of the piston and for cooling purposes. Such tools operated by internal combustion engines are subjected to violent vibrations during operation, and such a coupling must be capable of withstanding such vibrations. In addition the coupling must ensure, under these difficult conditions, satisfactory contact of the ignition current supply line, perfect sealing at the compressed air conduit, and easy manipulation.

According to the present invention there is provided a coupling device comprising a first coupling part, a second coupling part, a first surface on the first coupling part, a second surface on the second part, a first fluid duct in the first part and leading to the first surface, a second fluid duct in the second part and leading to the second surface, a first rubber ring in the first fluid duct and projecting from the first surface, a second rubber ring in the second fluid duct and projecting from the second surface, the first rubber ring being pressed fluid tight against the second rubber ring in the coupled position of the first and second parts, a first electrical contact at the first surface and beside the first rubber ring, a second electrical contact at the second surface and beside the second rubber ring, the first and second contacts effecting electrical continuity in the coupled position of first and second parts, a spring loaded retaining means for releasably connecting the first part to the second part, a toggle mechanism for maintaining the first and second parts in the coupled position, the retaining means and the toggle mechanism being mounted on the first part, a first hook means on the second part, which first hook means is engageable by a portion of the toggle mechanism, and a second hook means on the second part, the second hook means being engageable by the retaining means.

For a better understanding of the invention and to show how the same may be carried into effect reference will now be made to the accompanying drawing in which:

Figure 1 is a sectional view of the coupling, taken along the line A—B of Figure 2 in the connected-up condition, Figure 2 is a plan view of the coupling of Figure 1, and Figure 3 is a view of the coupling of Figure 2 taken in the direction of the arrow C.

The flexible pipe coupling includes coupling flanges 1 and 2, both of which comprise a threaded stub pipe 3 whose bore 4 serves as a duct for compressed air. A sleeve for the compressed air hose can be screwed on to the threaded stub pipe 3. The threaded pipe 3 can also be screwed into the casing of the tool or the air compressor. Situated in extensions of the bores 4 are rubber rings 5 which are so constructed that they yield in the direction of the centre axis 6 when a force is exerted in this direction against the sealing lips 7. The flange 1 carries at its ends hook-like projections 8 into which engage at one end of the flange 1 stirrup 9 of the toggle lever 10, and at the other end of the flange a suspension member 11. The toggle lever 10 is fixed to the coupling flange 2 by means of a pin 12. At the other end of the coupling flange 2, the suspension member 11, which is U-shaped, is inserted through two holes formed in the flange. A disc 14 whose diameter exceeds that of the arms of the U is provided on the end of each arm of the U. A spiral spring 13 engages each arm, each spring 13 bears against the flange 2 and against the riveted-on disc 14 on the associated arm. The springs 13 tend to press the suspension member 11, and thus the flange 1, against the flange 2. The force of the springs 13 is so dimensioned that they are capable of supplying a force adequate to deform the sealing lips 7 of the rubber rings 5. Also arranged at the mutually facing end faces 15 of the coupling flanges 1 and 2, in addition to the rubber rings 5, are insulating sockets 16 which are preferably produced from an insulating synthetic resin molded material. The insulating sockets 16 are arranged at that side of the sealing rings 5 which is remote from the toggle lever 10. Contact elements 17 are inserted into the insulating sockets 16. The elements 17 are made of a material of good conducting properties. The ends 18 of an ignition cable are soldered into the contact elements 17.

The coupling is manipulated in the following manner:

In order to connect the two flanges, the projection 8 of the coupling flange 1 is introduced into the suspension member 11. The toggle lever 10 is swung so far in the counterclockwise direction that the stirrup 9 can easily be fitted over the other projection 8 of the coupling flange 1. By turning the toggle lever 10 in the clockwise direction, the stirrup 9 pulls the flange 1 towards the flange 2, so that the rubber rings 5 come to bear with their sealing lips 7 against one another, and in so doing the rings 5 are compressed in the direction of the axis 6. The bores 4 are thereby sealed. The contact elements 17 are likewise caused to bear against one another, the springs 13 applying the pressure necessary for contact. The position of the contact elements 17 and the length of the stirrup 9 are so chosen that the contact elements 17 bear flat against one another when the flanges are connected together. By positioning the contact elements 17 at the side of the coupling that is remote from the toggle lever closure, the result is achieved that inaccuracies in manufacturing the toggle lever closure have only a very slight effect on the contact elements bearing flush against one another.

What is claimed is:

1. A coupling device comprising a first coupling part, a second coupling part, a first surface on the first coupling part, a second surface on the second part, a first fluid duct in the first part and leading to the first surface, a second fluid duct in the second part and leading to the second surface, a first rubber ring in the first fluid duct and projecting from the first surface, a second rubber ring in the second fluid duct and projecting from the second surface, the first rubber ring being pressed fluid tight against the second rubber ring in the coupled position of first and second parts, a first electrical contact at the first surface and beside the first rubber ring, a second electrical contact at the second surface and beside the second rubber ring, the first and second contacts effecting electrical continuity in the coupled position of first and second parts, a spring loaded retaining means for releasably connecting the first part to the second part, a toggle mechanism for maintaining the first and second parts in the coupled position, the retaining means and the toggle mechanism being mounted on the first part, a first hook means on the second part, which first hook means is engageable by a portion of the toggle mechanism, and a second hook means on the second part, the second hook means being engageable by the retaining means.

2. A coupling device as claimed in claim 1, wherein the first part has two holes therethrough and wherein the retaining means comprises a U-shaped member engageable with said second hook means and including two arms inserted one through each of said two holes, a disc secured on the projecting end of each arm, and a spring mounted on each arm between said first part and the adjacent disc, the springs urging the second hook means of said second part toward said first part.

References Cited in the file of this patent

UNITED STATES PATENTS

| | | |
|---|---|---|
| 1,016,728 | Barber | Feb. 6, 1912 |
| 1,844,916 | Dykes | Feb. 9, 1932 |

FOREIGN PATENTS

| | | |
|---|---|---|
| 6,173 | Great Britain | of 1908 |